United States Patent [19]

Tack et al.

[11] Patent Number: 4,715,556
[45] Date of Patent: Dec. 29, 1987

[54] SPOOL

[75] Inventors: Rufin Tack, Deerlijk; Marc Eggermont, Aalter, both of Belgium

[73] Assignee: N.V. Bekaert S.A., Zwevegem, Belgium

[21] Appl. No.: 841,221

[22] Filed: Mar. 19, 1986

[30] Foreign Application Priority Data

Apr. 1, 1985 [BE] Belgium .............................. 1/011224

[51] Int. Cl.⁴ ........................ B65H 75/18; B25G 3/20
[52] U.S. Cl. .................................. 242/118.6; 403/370; 403/374
[58] Field of Search ..................... 242/71.8, 77.3, 77.4, 242/116, 118.4, 118.6, 118.61, 118.62, 115, 117, 118.5, 68.5; 403/370, 374, 369

[56] References Cited

U.S. PATENT DOCUMENTS

| | | | |
|---|---|---|---|
| 1,915,825 | 6/1933 | Hescock | 242/77.4 |
| 1,919,270 | 7/1933 | Bird | 242/118.61 |
| 2,163,685 | 6/1939 | Howsam | 242/118.6 X |
| 2,575,131 | 11/1951 | Salkin | 242/118.6 X |
| 2,649,260 | 8/1953 | Beneke | 242/115 |
| 3,834,639 | 9/1974 | Barber | 242/68 |
| 4,083,513 | 4/1978 | Pfarrawaller | 242/118.5 X |
| 4,462,555 | 7/1984 | Olson et al. | 242/118.6 |

FOREIGN PATENT DOCUMENTS

| | | |
|---|---|---|
| 589494 | 4/1960 | Belgium . |
| 1665158 | 5/1971 | Fed. Rep. of Germany . |
| 2347962 | 4/1975 | Fed. Rep. of Germany . |
| 2351849 | 4/1975 | Fed. Rep. of Germany . |
| 1337184 | 7/1963 | France . |
| 2071523 | 4/1971 | France . |
| 2398212 | 2/1979 | France . |

Primary Examiner—David Werner
Attorney, Agent, or Firm—Schwartz, Jeffery, Schwaab, Mack, Blumenthal & Evans

[57] ABSTRACT

This invention relates to a spool comprising a central portion (2) and two flanges (3) which can be attached to each other by means of fastening means (7), whereby both flanges (3) are provided with fastening means (7) which are located at the innerside (6) of these flanges (3) and which are attachable to the innerside (5) of the central portion (2).

8 Claims, 3 Drawing Figures

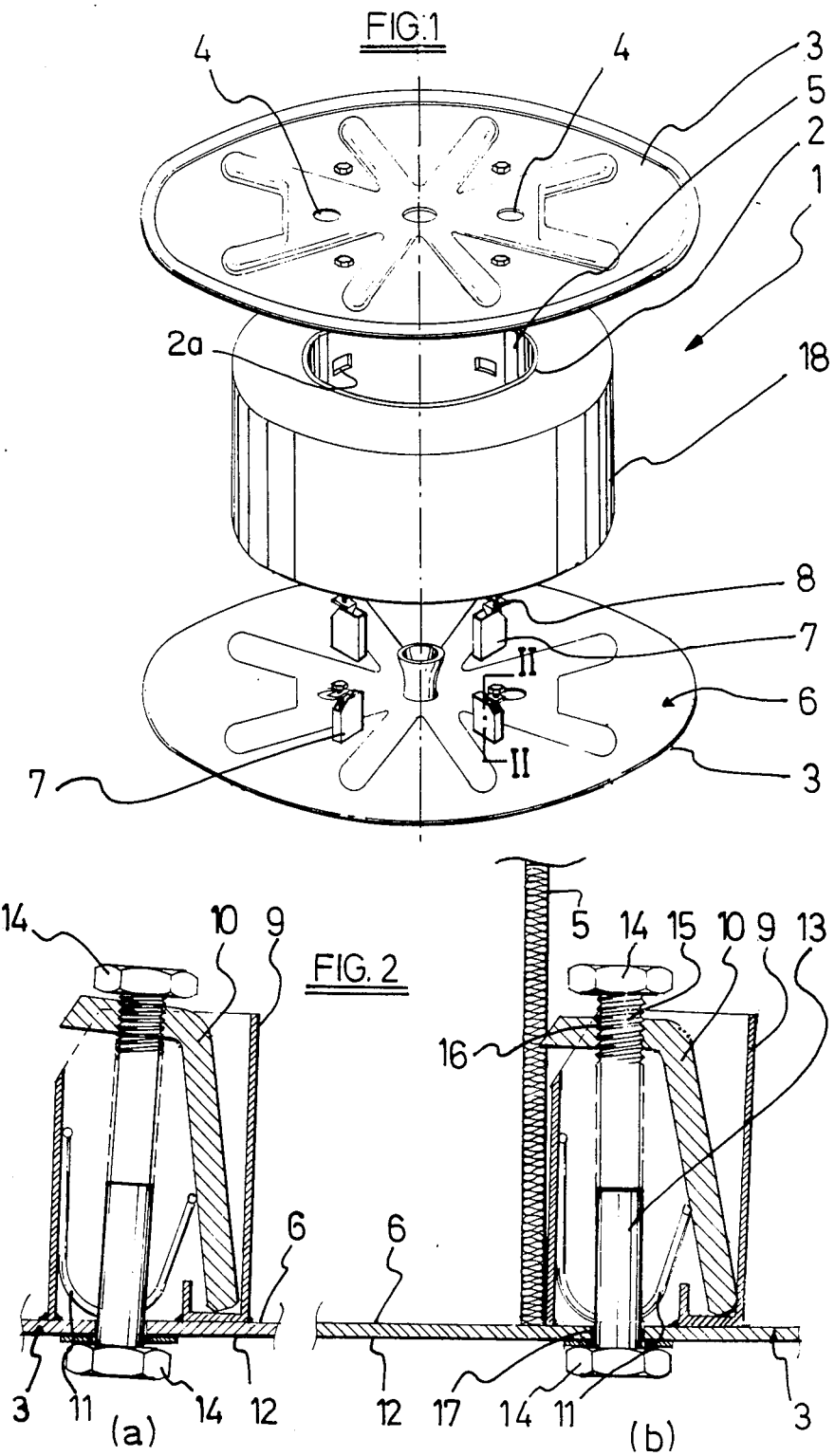

SPOOL

BACKGROUND

1. Field of the Invention

This invention relates to a spool comprising a central portion and two flanges, which can be attached to each other by means of fastening means.

2. Related Art

Such spools comprising a central portion and flanges which can be attached thereto have been known for a long time. For example, a similar spool is described in the Belgian Pat. No. 589,494.

Also well known is a method of winding wire or other elongate material on such a central spool portion by means of special machines, whereby the wire thus wound on a similar central portion is fixed by means of bands, wires or clamps. This kind of make-up for wire or elongate material on a central portion of a spool without flanges is usually called "spoolless coil". Spoolless coils are widely used as they strongly reduce transportation costs, in particular since the customer is not required to return empty spools to the supplier. A disadvantage, however, is that the customer must be equipped with special machines for paying off the wire or elongate material from the central portion of the spool or spoolless coil. These machines usually consist of two reciprocally movable parts between which the central portion of the spool can be clamped down.

SUMMARY

The object of the invention is to provide a new type of spool whereby it becomes possible to eliminate the use of such special pay-off and take-up machines.

For this purpose the invention provides a spool of the type mentioned at the outset, in which both flanges of the spool are provided with fastening means which are located at the innersides of these flanges and which are attachable to the innerside of the central portion.

The advantage of such a spool according to the invention is that it has now become possible to assemble such a spool by fixing the flanges to the central portion, even when this central portion has material, such as wire, wound on it over its full width.

In a preferred embodiment of the spool according to the invention the fastening means of the first flange are provided with operating means that can be operated at the innerside of this first flange, while the fastening means of the second flange are provided with operating means that can be operated at the outerside of this second flange. The advantage is that the central portion can be fixed first to the first flange by operating the fastening means by means of the operating means located at the innerside of the first flange, and that it is still possible to attach the second flange to the central portion as the operating means of the fastening means of the second flange are located at the outerside of this flange.

In a further preferred embodiment the fastening means of both flanges are provided with operating means which can be operated at both the innersides and the outersides of these flanges. The advantage being that it is no longer necessary to make a distinction between a first and second flange.

BRIEF DESCRIPTION OF THE DRAWINGS

Further embodiments will be clarified in greater detail in the following description whereby reference is made to the adjoining drawings in which:

FIG. 1 is a perspective view of a spool according to the invention whereby the central portion and the flanges are detached from each other;

FIG. 2a is a cross-sectional view according to the line II—II in FIG. 1 of a fastening means and the corresponding operating means whereby the fastening means is in open position; and FIG. 2b is a drawing analoguous to that of FIG. 2a whereby the fastening means is in closed position.

DETAILED DESCRIPTION

FIG. 1 is a perspective view of a spool 1 according to the invention, whereby the central portion 2 and the flanges 3 are shown detached from each other. The central portion 2 is preferably made of cardboard. This central section 2, however, may be made of any other material such as plastic, metal, etc. The central portion 2 is preferably cylindrical. The flanges 3 are preferably made of steel sheet and are provided with a circumferential edge and reinforcement ribs. The flanges 3 also have a number of apertures 4 so that it can be checked whether a flange 3 is correctly located relative to the innerside 5 of the central portion 2.

At their inner sides 6 the flanges 3 are also provided with a number of fastening means 7. These fastening means 7 can be attached to the central portion 2 at the latter's innerside 5. For this purpose the central portion 2 may have at its innerside 5 recesses for receiving the fastening means or upright parts (collars) for hooking the fastening means into them. The fastening means 7 are located on a circle circumference the radius of which is slightly inferior to less than the radius of the cylindrical central portion 2.

FIGS. 2a and 2b show a special embodiment of a fastening means 7 and the corresponding operation (tightening) means 8 for a spool 1 according to the invention. The fastening means 7 consists of a support 9 which is welded to the innerside 6 of the flange 3. A clamp 10 located in the support 9 can, under the action of a spring 11, be fixed into the innerside 5 of the central section 2. This clamping can be realised automatically under the action of the spring 11 when the shape of the clamp 10 is adapted in such a way that this clamp 10 hooks into the upright parts of the central portion 2 or alternatively into the recesses 2a provided in the innerside 5 of the central portion 2.

Each fastening means 7 is preferably provided with operating means 8 which can be operated at the innerside 6 and at the outerside 12 of the flange 3. According to the embodiment shown in the FIGS. 2a and 2b, these operating means 8 consist of a screw bolt 13 with two fixed nuts 14 at its ends; whereby the first nut 14 is located at the innerside 6 and the second nut at the outerside 12 of this flange 3. The screw thread 15 of the screw bolt 13 at the one end engages with a screw thread 16 at the end of the clamp 10; whereas the other end of the screw bolt 13 projects with the corresponding nut 14 loosely through an aperture 17 in the outside of the flange 3.

The flanges 3 are attached to the central portion 2 of the spool 1 as follows: The central portion 2 with the elongate material 18 on it is placed on the first flange 3 (see FIG. 1), in such a way that the supports 9 are located within the confines of the central portion 2. By means of a wrench or other suitable tool the nuts 14 at the innerside 6 of the first flange 3, are tightened so that the clamps 10 of the first flange 3 are fixedly driven into cardboard of the central portion 2 (see FIG. 2b). Subsequently, the second flange 3 (see FIG. 1) is placed on the central portion 2, so that the supports 9 are also located within the confines of the central portion 2. By means of a wrench or other suitable tool the nuts 14 at the outerside 12 of the second flange 3 are tightened, so that the clamps 10 of the second flange 3 are fixedly driven into the cardboard of the central portion 2.

We claim:

1. A spool comprising:
   a central portion, and
   two flanges attachable thereto by fastening means,
   each flange having an innerside and an outerside and being provided with said fastening means located on the innerside of at least one of the flanges and being attachable to an innerside of the central portion,
   the fastening means comprising supports provided with a spring and a clamp (10), said clamp coacting with said spring.

2. A spool accordidng to claim 1, wherein the fastening means are provided with operating means comprising a screw bolt with two fixed nuts, whereby a screw-thread of the screw bolt engages with a screw-thread of the clamp and whereby a first nut is located at the innerside of the flange and the second nut is located at the outerside of the flange.

3. A spool according to claim 1 wherein the central portion is made of cardboard.

4. A spool according to claim 1 wherein the central portion at its innerside is provided with recesses for receiving the fastening means.

5. A spool according to claim 1 wherein the central portion (2) at its innerside (5) is provided with means for fixing the fastening means (7).

6. A spool according to claim 5 wherein the fixing means are collars.

7. A spool according to claim 5 wherein fixing means are upright parts.

8. A spool according to claim 1 wherein the fastening means of both flanges are provided with tightening means operable from both the innerside and outerside of the flanges.

* * * * *